(12) United States Patent
Wei

(10) Patent No.: US 7,272,174 B2
(45) Date of Patent: Sep. 18, 2007

(54) UPSTREAM DATA TRANSMISSION

(75) Inventor: Lee-Fang Wei, Lincroft, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 11/133,099

(22) Filed: May 19, 2005

(65) Prior Publication Data

US 2005/0213671 A1 Sep. 29, 2005

Related U.S. Application Data

(62) Division of application No. 09/826,686, filed on Apr. 5, 2001, now Pat. No. 6,931,072.

(60) Provisional application No. 60/195,494, filed on Apr. 6, 2000, provisional application No. 60/249,123, filed on Nov. 16, 2000.

(51) Int. Cl.
*H04B 1/38* (2006.01)
*H04L 1/00* (2006.01)

(52) U.S. Cl. ........... 375/222; 375/346

(58) Field of Classification Search ........ 375/219, 375/222, 259, 341, 346; 379/406.01
See application file for complete search history.

(56) References Cited

U.S. PATENT DOCUMENTS

| | | | |
|---|---|---|---|
| 4,713,817 A | 12/1987 | Wei | 371/43 |
| 5,195,107 A | 3/1993 | Wei | 375/18 |
| 5,289,459 A * | 2/1994 | Brownlie | 370/252 |
| 5,377,194 A * | 12/1994 | Calderbank | 370/524 |
| 5,394,437 A | 2/1995 | Ayanoglu et al. | 375/222 |
| 5,418,798 A | 5/1995 | Wei | 371/43 |
| 5,543,952 A | 8/1996 | Yonenaga et al. | 359/181 |
| 5,559,561 A | 9/1996 | Wei | 348/470 |
| 5,710,790 A | 1/1998 | Herzberg et al. | 375/219 |
| 5,790,632 A | 8/1998 | Antionio et al. | 379/3 |
| 5,854,812 A | 12/1998 | Huber et al. | 375/296 |
| 5,867,534 A | 2/1999 | Price et al. | 375/286 |
| 5,872,817 A * | 2/1999 | Wei | 375/341 |

(Continued)

FOREIGN PATENT DOCUMENTS

WO WO99/34565 7/1999

OTHER PUBLICATIONS

PCT Search Report, Application No. PCT/US 01/11162, Oct. 23, 2001.

(Continued)

*Primary Examiner*—David B. Lugo
(74) *Attorney, Agent, or Firm*—John F. McCabe

(57) ABSTRACT

A process transmits digital data to an A/D converter via an analog channel. The process includes generating a sequence of output signals by precoding a sequence of input signal points to precompensate for ISI in the analog channel. In the precoding is matched to the ISI, at least one of the output signals would be distorted by the ISI to a signal representative of a signal point lying between quantization levels of the A/D converter. If the precoding is matched to the ISI, others of the output signals would be distorted by the ISI to signals representative of signal points that are quantization levels of the A/D converter. A majority of the input signal points are quantization levels of the A/D converter.

9 Claims, 15 Drawing Sheets

U.S. PATENT DOCUMENTS

| | | | |
|---|---|---|---|
| 5,881,108 A | 3/1999 | Herzberg et al. | 375/296 |
| 5,953,376 A | 9/1999 | Wei | 375/265 |
| 5,986,596 A | 11/1999 | Waldron | 341/138 |
| 5,991,278 A | 11/1999 | Betts | 370/276 |
| 6,009,121 A | 12/1999 | Waldron et al. | 375/254 |
| 6,157,678 A | 12/2000 | Wei | 375/243 |
| 6,201,842 B1 * | 3/2001 | Kim | 375/346 |
| 6,356,585 B1 * | 3/2002 | Ko et al. | 375/222 |
| 6,366,418 B1 | 4/2002 | McEwen et al. | 360/48 |
| 6,393,075 B1 | 5/2002 | Xu | 375/341 |
| 6,426,821 B1 | 7/2002 | Price et al. | 359/156 |
| 6,463,031 B1 * | 10/2002 | Tran | 370/203 |
| 6,553,074 B1 * | 4/2003 | Shalvi et al. | 375/242 |
| 6,577,683 B1 * | 6/2003 | Waldron et al. | 375/242 |
| 6,646,994 B1 * | 11/2003 | Hendrichs et al. | 370/252 |
| 6,678,319 B1 | 1/2004 | Jamali | 375/234 |

OTHER PUBLICATIONS

Wei, L. F. et al: *Combined Coding and Precoding for Recommendation V.92*, V. 92, Rapporteur Meeting, Boca Raton, Florida, Jan. 11-14, 2000.

Wei, L. F. et al: *Pre-equalization for Recommendation V.90—Issue 2*, Telecommunications Industry Association (TIA), Clearwater, Florida, Nov. 29, 1999.

* cited by examiner

FIG. 3

| ±A₁ | ±A₂ | ±A₃ | ±A₄ | ±A₅ | ±A₆ | ±A₇ | ±A₈ |
|---|---|---|---|---|---|---|---|
| 0 | ±16.5 | ± 49.5 | ±115.5 | ±247.5 | ±511.5 | ±1039.5 | ±2095.5 |
| ± 1 | ±18.5 | ± 53.5 | ±123.5 | ±263.5 | ±543.5 | ±1103.5 | ±2223.5 |
| ± 2 | ±20.5 | ± 57.5 | ±131.5 | ±279.5 | ±575.5 | ±1167.5 | ±2351.5 |
| ± 3 | ±22.5 | ± 61.5 | ±139.5 | ±295.5 | ±607.5 | ±1231.5 | ±2479.5 |
| ± 4 | ±24.5 | ± 65.5 | ±147.5 | ±311.5 | ±639.5 | ±1295.5 | ±2607.5 |
| ± 5 | ±26.5 | ± 69.5 | ±155.5 | ±327.5 | ±671.5 | ±1359.5 | ±2735.5 |
| ± 6 | ±28.5 | ± 73.5 | ±163.5 | ±343.5 | ±703.5 | ±1423.5 | ±2863.5 |
| ± 7 | ±30.5 | ± 77.5 | ±171.5 | ±359.5 | ±735.5 | ±1487.5 | ±2991.5 |
| ± 8 | ±32.5 | ± 81.5 | ±179.5 | ±375.5 | ±767.5 | ±1551.5 | ±3119.5 |
| ± 9 | ±34.5 | ± 85.5 | ±187.5 | ±391.5 | ±799.5 | ±1615.5 | ±3247.5 |
| ±10 | ±36.5 | ± 89.5 | ±195.5 | ±407.5 | ±831.5 | ±1679.5 | ±3375.5 |
| ±11 | ±38.5 | ± 93.5 | ±203.5 | ±423.5 | ±863.5 | ±1743.5 | ±3503.5 |
| ±12 | ±40.5 | ± 97.5 | ±211.5 | ±439.5 | ±895.5 | ±1807.5 | ±3631.5 |
| ±13 | ±42.5 | ±101.5 | ±219.5 | ±455.5 | ±927.5 | ±1871.5 | ±3759.5 |
| ±14 | ±44.5 | ±105.5 | ±227.5 | ±471.5 | ±959.5 | ±1935.5 | ±3887.5 |
| ±15 | ±46.5 | ±109.5 | ±235.5 | ±487.5 | ±991.5 | ±1999.5 | ±4015.5 |

FIG. 4

| 55 | 56 | 57 | |
|---|---|---|---|
| ± 16.5 | ± 1,039.5 | ± 2,063.5* | ± 2,607.5 |
| ± 49.5 | ± 1,103.5 | ± 2,095.5 | ± 2,639.5* |
| ± 81.5 | ± 1,167.5 | ± 2,127.5* | ± 2,671.5* |
| ± 115.5 | ± 1,231.5 | ± 2,159.5* | ± 2,703.5* |
| ± 147.5 | ± 1,295.5 | ± 2,191.5* | ± 2735.5 |
| ± 179.5 | ± 1,359.5 | ± 2,223.5 | ± 2,767.5* |
| ± 211.5 | ± 1,423.5 | ± 2,255.5* | ± 2,799.5* |
| ± 247.5 | ± 1,487.5 | ± 2,287.5* | ± 2,831.5* |
|  | ± 1,551.5 | ± 2,319.5* |  |
| ± 279.5 | ± 1,615.5 | ± 2,351.5 | ± 2,863.5 |
| ± 311.5 | ± 1,679.5 | ± 2,383.5* | ± 2,895.5* |
| ± 343.5 | ± 1,743.5 | ± 2,415.5* | ± 2,927.5* |
| ± 375.5 | ± 1,807.5 | ± 2,447.5* | ± 2,959.5* |
| ± 407.5 | ± 1,871.5 | ± 2,479.5 | ± 2,991.5 |
| ± 439.5 | ± 1,935.5 | ± 2,511.5* | ± 3,023.5* |
| ± 471.5 | ± 1,999.5 | ± 2,543.5* | ± 3,055.5* |
| ± 511.5 |  | ± 2,575.5* | ± 3,087.5* |
| ± 543.5 |  |  | ± 3,119.5 |
| ± 575.5 |  |  | ± 3,151.5* |
| ± 607.5 |  |  | ± 3,183.5* |
| ± 639.5 |  |  | ± 3,215.5* |
| ± 671.5 | 54 |  | ± 3,247.5 |
| ± 703.5 |  |  | ± 3,279.5* |
| ± 735.5 |  |  | ± 3,311.5* |
| ± 767.5 |  |  | ± 3,343.5* |
| ± 799.5 |  |  | ± 3,375.5 |
| ± 831.5 |  |  | ± 3,407.5* |
| ± 863.5 |  |  | ± 3,439.5* |
| ± 895.5 |  |  | ± 3,471.5* |
| ± 927.5 |  |  | ± 3,503.5 |
| ± 959.5 |  |  | ± 3,535.5* |
| ± 991.5 |  |  | ± 3,567.5* |
|  |  |  | ± 3,599.5* |

FIG. 5A

| BIT PATTERN | SIGNAL POINT | POSITIVE MODULE AMOUNT | NEGATIVE MODULE AMOUNT |
|---|---|---|---|
| 100100 | 639.5 | +1,808 | −1,311 |
| 100101 | 607.5 | +1,808 | −1,311 |
| 100110 | 575.5 | +1,808 | −1,311 |
| 100111 | 543.5 | +1,808 | −1,311 |
| 000000 | 511.5 | +1,808 | −1,311 |
| 000001 | 471.5 | +1,816 | −1,303 |
| 000010 | 439.5 | +1,816 | −1,303 |
| 000011 | 407.5 | +1,816 | −1,303 |
| 000100 | 375.5 | +1,816 | −1,303 |
| 000101 | 343.5 | +1,816 | −1,303 |
| 000110 | 311.5 | +1,816 | −1,303 |
| 000111 | 279.5 | +1,816 | −1,319 |
| 001000 | 247.5 | +1,816 | −1,351 |
| 001001 | 211.5 | +1,788 | −1,379 |
| 001010 | 179.5 | +1,756 | −1,411 |
| 001011 | 147.5 | +1,724 | −1,443 |
| 001100 | 115.5 | +1,692 | −1,475 |
| 001101 | 81.5 | +1,662 | −1,505 |
| 001110 | 49.5 | +1,630 | −1,537 |
| 001111 | 16.5 | +1,599 | −1,568 |
| 010000 | −16.5 | +1,568 | −1,599 |
| 010001 | −49.5 | +1,537 | −1,630 |
| 010010 | −81.5 | +1,505 | −1,662 |
| 010011 | −115.5 | +1,475 | −1,692 |
| 010100 | −147.5 | +1,443 | −1,724 |
| 010101 | −179.5 | +1,411 | −1,756 |
| 010110 | −211.5 | +1,379 | −1,788 |
| 010111 | −247.5 | +1,351 | −1,816 |
| 011000 | −279.5 | +1,319 | −1,816 |
| 011001 | −311.5 | +1,303 | −1,816 |
| 011010 | −343.5 | +1,303 | −1,816 |
| 011011 | −375.5 | +1,303 | −1,816 |
| 011100 | −407.5 | +1,303 | −1,816 |
| 011101 | −439.5 | +1,303 | −1,816 |
| 011110 | −471.5 | +1,303 | −1,816 |
| 011111 | −511.5 | +1,311 | −1,808 |
| 100000 | −543.5 | +1,311 | −1,808 |
| 100001 | −575.5 | +1,311 | −1,808 |
| 100010 | −607.5 | +1,311 | −1,808 |
| 100011 | −639.5 | +1,311 | −1,808 |

| BIT PATTERN | SIGNAL POINT | SIGNAL POINT |
| --- | --- | --- |
| 100100 | 2,447.5* | −671.5 |
| 100101 | 2,415.5* | −703.5 |
| 100110 | 2,383.5* | −735.5 |
| 100111 | 2,351.5 | −767.5 |
| 000000 | 2,319.5* | −799.5 |
| 000001 | 2,287.5* | −831.5 |
| 000010 | 2,255.5* | −863.5 |
| 000011 | 2,223.5 | −895.5 |
| 000100 | 2,191.5* | −927.5 |
| 000101 | 2,159.5* | −959.5 |
| 000110 | 2,127.5* | −991.5 |
| 000111 | 2,095.5 | −1,039.5 |
| 001000 | 2,063.5* | −1,103.5 |
| 001001 | 1,999.5 | −1,167.5 |
| 001010 | 1,935.5 | −1,231.5 |
| 001011 | 1,871.5 | −1,295.5 |
| 001100 | 1,807.5 | −1,359.5 |
| 001101 | 1,743.5 | −1,423.5 |
| 001110 | 1,679.5 | −1,487.5 |
| 001111 | 1,615.5 | −1,551.5 |
| 010000 | 1,551.5 | −1,615.5 |
| 010001 | 1,487.5 | −1,679.5 |
| 010010 | 1,423.5 | −1,743.5 |
| 010011 | 1,359.5 | −1,807.5 |
| 010100 | 1,295.5 | −1,871.5 |
| 010101 | 1,231.5 | −1,935.5 |
| 010110 | 1,167.5 | −1,999.5 |
| 010111 | 1,103.5 | −2,063.5* |
| 011000 | 1,039.5 | −2,095.5 |
| 011001 | 991.5 | −2,127.5* |
| 011010 | 959.5 | −2,159.5* |
| 011011 | 927.5 | −2,191.5* |
| 011100 | 895.5 | −2,223.5 |
| 011101 | 863.5 | −2,255.5* |
| 011110 | 831.5 | −2,287.5* |
| 011111 | 799.5 | −2,319.5* |
| 100000 | 767.5 | −2,351.5 |
| 100001 | 735.5 | −2,383.5* |
| 100010 | 703.5 | −2,415.5* |
| 100011 | 671.5 | −2,447.5* |

| BIT PATTERN | SIGNAL POINT | POSITIVE MODULE AMOUNT | NEGATIVE MODULE AMOUNT |
|---|---|---|---|
| 101000 | 767.5 | +2,064 | −1,567 |
| 101001 | 735.5 | +2,064 | −1,567 |
| 101010 | 703.5 | +2,064 | −1,567 |
| 101011 | 671.5 | +2,064 | −1,567 |
| 101100 | 639.5 | +2,064 | −1,567 |
| 101101 | 607.5 | +2,064 | −1,567 |
| 101110 | 575.5 | +2,064 | −1,567 |
| 101111 | 543.5 | +2,064 | −1,583 |
| 000000 | 511.5 | +2,064 | −1,615 |
| 000001 | 471.5 | +2,072 | −1,639 |
| 000010 | 439.5 | +2,072 | −1,671 |
| 000011 | 407.5 | +2,072 | −1,703 |
| 000100 | 375.5 | +2,072 | −1,735 |
| 000101 | 343.5 | +2,072 | −1,767 |
| 000110 | 311.5 | +2,072 | −1,799 |
| 000111 | 279.5 | +2,072 | −1,831 |
| 001000 | 247.5 | +2,072 | −1,863 |
| 001001 | 211.5 | +2,076 | −1,891 |
| 001010 | 179.5 | +2,076 | −1,923 |
| 001011 | 147.5 | +2,076 | −1,955 |
| 001100 | 115.5 | +2,076 | −1,987 |
| 001101 | 81.5 | +2,078 | −2,017 |
| 001110 | 49.5 | +2,078 | −2,049 |
| 001111 | 16.5 | +2,079 | −2,080 |
| 010000 | −16.5 | +2,080 | −2,079 |
| 010001 | −49.5 | +2,049 | −2,078 |
| 010010 | −81.5 | +2,017 | −2,078 |
| 010011 | −115.5 | +1,987 | −2,076 |
| 010100 | −147.5 | +1,955 | −2,076 |
| 010101 | −179.5 | +1,923 | −2,076 |
| 010110 | −211.5 | +1,891 | −2,076 |
| 010111 | −247.5 | +1,863 | −2,072 |
| 011000 | −279.5 | +1,831 | −2,072 |
| 011001 | −311.5 | +1,799 | −2,072 |
| 011010 | −343.5 | +1,767 | −2,072 |
| 011011 | −375.5 | +1,735 | −2,072 |
| 011100 | −407.5 | +1,703 | −2,072 |
| 011101 | −439.5 | +1,671 | −2,072 |
| 011110 | −471.5 | +1,639 | −2,072 |
| 011111 | −511.5 | +1,615 | −2,064 |
| 100000 | −543.5 | +1,583 | −2,064 |
| 100001 | −575.5 | +1,567 | −2,064 |
| 100010 | −607.5 | +1,567 | −2,064 |
| 100011 | −639.5 | +1,567 | −2,064 |
| 100100 | −671.5 | +1,567 | −2,064 |
| 100101 | −703.5 | +1,567 | −2,064 |
| 100110 | −735.5 | +1,567 | −2,064 |
| 100111 | −767.5 | +1,567 | −2,064 |

| BIT PATTERN | SIGNAL POINT | SIGNAL POINT |
|---|---|---|
| 101000 | 2,831.5* | −799.5 |
| 101001 | 2,799.5* | −831.5 |
| 101010 | 2,767.5* | −863.5 |
| 101011 | 2,735.5 | −895.5 |
| 101100 | 2,703.5* | −927.5 |
| 101101 | 2,671.5* | −959.5 |
| 101110 | 2,639.5* | −991.5 |
| 101111 | 2,607.5 | −1,039.5 |
| 000000 | 2,575.5* | −1,103.5 |
| 000001 | 2,543.5* | −1,167.5 |
| 000010 | 2,511.5* | −1,231.5 |
| 000011 | 2,479.5 | −1,295.5 |
| 000100 | 2,447.5* | −1,359.5 |
| 000101 | 2,415.5* | −1,423.5 |
| 000110 | 2,383.5* | −1,487.5 |
| 000111 | 2,351.5 | −1,551.5 |
| 001000 | 2,319.5* | −1,615.5 |
| 001001 | 2,287.5* | −1,679.5 |
| 001010 | 2,255.5* | −1,743.5 |
| 001011 | 2,223.5 | −1,807.5 |
| 001100 | 2,191.5* | −1,871.5 |
| 001101 | 2,159.5* | −1,935.5 |
| 001110 | 2,127.5* | −1,999.5 |
| 001111 | 2,095.5 | −2,063.5* |
| 010000 | 2,063.5* | −2,095.5 |
| 010001 | 1999.5 | −2,127.5* |
| 010010 | 1,935.5 | −2,159.5* |
| 010011 | 1,871.5 | −2,191.5* |
| 010100 | 1,807.5 | −2,223.5 |
| 010101 | 1,743.5 | −2,255.5* |
| 010110 | 1,679.5 | −2,287.5* |
| 010111 | 1,615.5 | −2,319.5* |
| 011000 | 1,551.5 | −2,351.5 |
| 011001 | 1,487.5 | −2,383.5* |
| 011010 | 1,423.5 | −2,415.5* |
| 011011 | 1,359.5 | −2,447.5* |
| 011100 | 1,295.5 | −2,479.5 |
| 011101 | 1,231.5 | −2,511.5* |
| 011110 | 1,167.5 | −2,543.5* |
| 011111 | 1,103.5 | −2,575.5* |
| 100000 | 1,039.5 | −2,607.5 |
| 100001 | 991.5 | −2,639.5* |
| 100010 | 959.5 | −2,671.5* |
| 100011 | 927.5 | −2,703.5* |
| 100100 | 895.5 | −2,735.5 |
| 100101 | 863.5 | −2,767.5* |
| 100110 | 831.5 | −2,799.5* |
| 100111 | 799.5 | −2,831.5* |

| BIT PATTERN | SIGNAL POINT | POSITIVE MODULE AMOUNT | NEGATIVE MODULE AMOUNT |
|---|---|---|---|
| 100100 | 327.5 | + 904 | − 671 |
| 100101 | 311.5 | + 904 | − 671 |
| 100110 | 295.5 | + 904 | − 671 |
| 100111 | 279.5 | + 904 | − 671 |
| 000000 | 263.5 | + 904 | − 671 |
| 000001 | 235.5 | + 916 | − 659 |
| 000010 | 219.5 | + 916 | − 659 |
| 000011 | 203.5 | + 916 | − 659 |
| 000100 | 187.5 | + 916 | − 659 |
| 000101 | 171.5 | + 916 | − 659 |
| 000110 | 155.5 | + 916 | − 667 |
| 000111 | 139.5 | + 916 | − 683 |
| 001000 | 123.5 | + 916 | − 699 |
| 001001 | 105.5 | + 918 | − 713 |
| 001010 | 89.5 | + 902 | − 729 |
| 001011 | 73.5 | + 886 | − 745 |
| 001100 | 57.5 | + 870 | − 761 |
| 001101 | 40.5 | + 855 | − 776 |
| 001110 | 24.5 | + 839 | − 792 |
| 001111 | 8.0 | + 823.5 | − 807.5 |
| 010000 | −8.0 | + 807.5 | − 823.5 |
| 010001 | −24.5 | + 792 | − 839 |
| 010010 | −40.5 | + 776 | − 855 |
| 010011 | −57.5 | + 761 | − 870 |
| 010100 | −73.5 | + 745 | − 886 |
| 010101 | −89.5 | + 729 | − 902 |
| 010110 | −105.5 | + 713 | − 918 |
| 010111 | −123.5 | + 699 | − 916 |
| 011000 | −139.5 | + 683 | − 916 |
| 011001 | −155.5 | + 667 | − 916 |
| 011010 | −171.5 | + 659 | − 916 |
| 011011 | −187.5 | + 659 | − 916 |
| 011100 | −203.5 | + 659 | − 916 |
| 011101 | −219.5 | + 659 | − 916 |
| 011110 | −235.5 | + 659 | − 916 |
| 011111 | −263.5 | + 671 | − 904 |
| 100000 | −279.5 | + 671 | − 904 |
| 100001 | −295.5 | + 671 | − 904 |
| 100010 | −311.5 | + 671 | − 904 |
| 100011 | −327.5 | + 671 | − 904 |

| BIT PATTERN | SIGNAL POINT | SIGNAL POINT |
| --- | --- | --- |
| 100100 | 1,231.5 | −343.5 |
| 100101 | 1,215.5* | −359.5 |
| 100110 | 1,199.5* | −375.5 |
| 100111 | 1,183.5* | −391.5 |
| 000000 | 1,167.5 | −407.5 |
| 000001 | 1,151.5* | −423.5 |
| 000010 | 1,135.5* | −439.5 |
| 000011 | 1,119.5* | −455.5 |
| 000100 | 1,103.5 | −471.5 |
| 000101 | 1,087.5* | −487.5 |
| 000110 | 1,071.5* | −511.5 |
| 000111 | 1,055.5* | −543.5 |
| 001000 | 1,039.5 | −575.5 |
| 001001 | 1,023.5* | −607.5 |
| 001010 | 991.5 | −639.5 |
| 001011 | 959.5 | −671.5 |
| 001100 | 927.5 | −703.5 |
| 001101 | 895.5 | −735.5 |
| 001110 | 863.5 | −767.5 |
| 001111 | 831.5 | −799.5 |
| 010000 | 799.5 | −831.5 |
| 010001 | 767.5 | −863.5 |
| 010010 | 735.5 | −895.5 |
| 010011 | 703.5 | −927.5 |
| 010100 | 671.5 | −959.5 |
| 010101 | 639.5 | −991.5 |
| 010110 | 607.5 | −1,023.5* |
| 010111 | 575.5 | −1,039.5 |
| 011000 | 543.5 | −1,055.5* |
| 011001 | 511.5 | −1,071.5* |
| 011010 | 487.5 | −1,087.5* |
| 011011 | 471.5 | −1,103.5 |
| 011100 | 455.5 | −1,119.5* |
| 011101 | 439.5 | −1,135.5* |
| 011110 | 423.5 | −1,151.5* |
| 011111 | 407.5 | −1,167.5 |
| 100000 | 391.5 | −1,183.5* |
| 100001 | 375.5 | −1,199.5* |
| 100010 | 359.5 | −1,215.5* |
| 100011 | 343.5 | −1,231.5 |

| BIT PATTERN | SIGNAL POINT | POSITIVE MODULE AMOUNT | NEGATIVE MODULE AMOUNT |
|---|---|---|---|
| 101000 | 391.5 | +1,032 | −799 |
| 101001 | 375.5 | +1,032 | −799 |
| 101010 | 359.5 | +1,032 | −799 |
| 101011 | 343.5 | +1,032 | −799 |
| 101100 | 327.5 | +1,032 | −799 |
| 101101 | 311.5 | +1,032 | −799 |
| 101110 | 295.5 | +1,032 | −807 |
| 101111 | 279.5 | +1,032 | −823 |
| 000000 | 263.5 | +1,032 | −839 |
| 000001 | 235.5 | +1,044 | −843 |
| 000010 | 219.5 | +1,044 | −859 |
| 000011 | 203.5 | +1,044 | −875 |
| 000100 | 187.5 | +1,044 | −891 |
| 000101 | 171.5 | +1,044 | −907 |
| 000110 | 155.5 | +1,044 | −923 |
| 000111 | 139.5 | +1,044 | −939 |
| 001000 | 123.5 | +1,044 | −955 |
| 001001 | 105.5 | +1,046 | −969 |
| 001010 | 89.5 | +1,046 | −985 |
| 001011 | 73.5 | +1,046 | −1,001 |
| 001100 | 57.5 | +1,046 | −1,017 |
| 001101 | 40.5 | +1,047 | −1,032 |
| 001110 | 24.5 | +1,047 | −1,048 |
| 001111 | 8.0 | +1,047.5 | −1,047.5 |
| 010000 | −8.0 | +1,047.5 | −1,047.5 |
| 010001 | −24.5 | +1,048 | −1,047 |
| 010010 | −40.5 | +1,032 | −1,047 |
| 010011 | −57.5 | +1,017 | −1,046 |
| 010100 | −73.5 | +1,001 | −1,046 |
| 010101 | −89.5 | +985 | −1,046 |
| 010110 | −105.5 | +969 | −1,046 |
| 010111 | −123.5 | +955 | −1,044 |
| 011000 | −139.5 | +939 | −1,044 |
| 011001 | −155.5 | +923 | −1,044 |
| 011010 | −171.5 | +907 | −1,044 |
| 011011 | −187.5 | +891 | −1,044 |
| 011100 | −203.5 | +875 | −1,044 |
| 011101 | −219.5 | +859 | −1,044 |
| 011110 | −235.5 | +843 | −1,044 |
| 011111 | −263.5 | +839 | −1,032 |
| 100000 | −279.5 | +823 | −1,032 |
| 100001 | −295.5 | +807 | −1,032 |
| 100010 | −311.5 | +799 | −1,032 |
| 100011 | −327.5 | +799 | −1,032 |
| 100100 | −343.5 | +799 | −1,032 |
| 100101 | −359.5 | +799 | −1,032 |
| 100110 | −375.5 | +799 | −1,032 |
| 100111 | −391.5 | +799 | −1,032 |

| BIT PATTERN | SIGNAL POINT | SIGNAL POINT |
|---|---|---|
| 101000 | 1,423.5 | −407.5 |
| 101001 | 1,407.5* | −423.5 |
| 101010 | 1,391.5* | −439.5 |
| 101011 | 1,375.5* | −455.5 |
| 101100 | 1,359.5 | −471.5 |
| 101101 | 1,343.5* | −487.5 |
| 101110 | 1,327.5* | −511.5 |
| 101111 | 1,311.5* | −543.5 |
| 000000 | 1,295.5 | −575.5 |
| 000001 | 1,279.5* | −607.5 |
| 000010 | 1,263.5* | −639.5 |
| 000011 | 1,247.5* | −671.5 |
| 000100 | 1,231.5 | −703.5 |
| 000101 | 1,215.5* | −735.5 |
| 000110 | 1,199.5* | −767.5 |
| 000111 | 1,183.5* | −799.5 |
| 001000 | 1,167.5 | −831.5 |
| 001001 | 1,151.5* | −863.5 |
| 001010 | 1,135.5* | −895.5 |
| 001011 | 1,119.5* | −927.5 |
| 001100 | 1,103.5 | −959.5 |
| 001101 | 1,087.5* | −991.5 |
| 001110 | 1,071.5* | −1,023.5* |
| 001111 | 1,055.5* | −1,039.5 |
| 010000 | 1,039.5 | −1,055.5* |
| 010001 | 1,023.5* | −1,071.5* |
| 010010 | 991.5 | −1,087.5* |
| 010011 | 959.5 | −1,103.5 |
| 010100 | 927.5 | −1,119.5* |
| 010101 | 895.5 | −1,135.5* |
| 010110 | 863.5 | −1,151.5* |
| 010111 | 831.5 | −1,167.5 |
| 011000 | 799.5 | −1,183.5* |
| 011001 | 767.5 | −1,199.5* |
| 011010 | 735.5 | −1,215.5* |
| 011011 | 703.5 | −1,231.5 |
| 011100 | 671.5 | −1,247.5* |
| 011101 | 639.5 | −1,263.5* |
| 011110 | 607.5 | −1,279.5* |
| 011111 | 575.5 | −1,295.5 |
| 100000 | 543.5 | −1,311.5* |
| 100001 | 511.5 | −1,327.5* |
| 100010 | 487.5 | −1,343.5* |
| 100011 | 471.5 | −1,359.5 |
| 100100 | 455.5 | −1,375.5* |
| 100101 | 439.5 | −1,391.5* |
| 100110 | 423.5 | −1,407.5* |
| 100111 | 407.5 | −1,423.5 |

103 104 105

UPSTREAM DATA TRANSMISSION

This is a divisional application of application Ser. No. 09/826,686 filed Apr. 5, 2001, now U.S. Pat. No. 6,931,072, which claims the benefit of Provisional Application No. 60/195,494 filed Apr. 6, 2000 and Provisional Application No. 60/249,123 filed Nov. 16, 2000.

BACKGROUND OF THE INVENTION

1. Field of the Invention

The present invention relates to transmitting digital data over analog channels.

2. Description of Related Art

In many communication systems, a modem is used to transmit digital data. The modem converts the data into a sequence of signal points and transmits the signal points to a near-end central office via an analog channel. In the near-end central office, a pulse code modulation voice coder (PCM vocoder) maps the received signal points to a set of quantization levels. The near-end central office transmits the sequence of quantization levels upstream to a far-end transceiver via a digital network.

In the analog channel, continuous time signals broaden and overlap through a phenomenon referred to as intersymbol interference (ISI). To remove ISI, conventional modems precode the signals prior to transmission to the analog channel. After precoding, channel broadening does not produce ISI. Instead, channel broadening converts signals that represented signal points of an original constellation prior to precoding into signals that represent signal points of an extended signal constellation. Conventionally, both original and extended constellations are derived from the quantization levels of the PCM vocoder. Precoding based on such constellations provides good noise performance in the absence of channel noise and echo.

Quantization replaces the continuous values of signals received from the analog channel by discrete levels through a process that includes sampling and either truncation or rounding of the received signals. Since quantization replaces continuous values by discrete levels, quantization introduces noise into the transmitted data. The magnitude of this quantization noise depends on the distance between the quantization levels of the PCM vocoder.

The far-end transceiver transmits signal points downstream to the near-end central office via the digital network. In the near-end central office, the signal points are converted into continuous time signals that are transmitted downstream to the modem via the same analog channel that carries other data upstream. The downstream transmission does not generate quantization noise if the values of signal points from the far-end transceiver correspond to quantization levels in the near-end central office. Quantization noise does not occur, because the digital network does not distort signal points. Thus, the near-end central office receives from the far-end transceiver signal points that correspond to the quantization levels.

SUMMARY OF THE INVENTION

Conventional precoders use extended constellations in which the signal points are quantization levels of a PCM vocoder. However, the PCM vocoder receives the signal points from an analog channel, and the analog channel introduces other noise besides ISI into signals. This other channel noise causes the received signal points to take values that differ from those of the extended constellation and to differ from the quantization levels. Also, prior to quantization in the PCM vocoder, echo from downstream transmission is added to the received signal points. The echo also causes the signal points to take values that differ from the quantization levels. For both reasons assigning the value of a quantization level to each signal point of the extended constellation sometimes leads to unacceptable levels of quantization noise.

In one aspect, the invention features a process for transmitting digital data to an A/D converter via an analog channel. The process includes generating a sequence of output signals by precoding a sequence of input signal points to precompensate for intersymbol interference (ISI) in the analog channel. In response to the precoding matching the ISI, at least one of the output signals would be distorted by the ISI to a signal representative of a signal point lying between quantization levels of the A/D converter. In response to the preceding matching the ISI, others of the output signals would be distorted by the ISI to signals representative of signal points that are quantization levels of the A/D converter. A majority of the input signal points are quantization levels of the A/D converter.

In another aspect, the invention features a process for communicating data over an analog channel in both downstream and upstream directions. The process includes monitoring an echo level caused by downstream data transmission and resetting a power level for downstream transmissions over the analog channel to a lower value. The act of resetting is responsive to determining that the monitored echo level interferes with upstream data transmissions over the analog channel.

Other advantages of the invention will be apparent to those of skill in the art from the description and drawings herein.

BRIEF DESCRIPTION OF THE DRAWINGS

FIG. 3 shows the µ-law quantization levels used by some PCM vocoders;

FIG. 4 shows an underlying space of signal points for constructing extended constellations with minimum distance 32 for precoders that transmit to PCM vocoders;

FIGS. 5A-5B show an extended constellation with minimum distance 32 that is used to precode data for transmission to a PCM vocoder;

FIGS. 6A-6B show another extended constellation with minimum distance 32 that is used to precode data for transmission to a PCM vocoder;

FIG. 7 shows an underlying space of signal points for constructing extended constellations with minimum distance 16 for precoders that transmit to PCM vocoders;

FIGS. 8A-8B show an extended constellation with minimum distance 16 that is used to precode data for transmission to a PCM vocoder;

FIGS. 9A-9B show another extended constellation with minimum distance 16 that is used to precode data for transmission to a PCM vocoder;

DETAILED DESCRIPTION OF THE EMBODIMENTS

In conventional modems, quantization noise occurs, because transmitted signal points are distorted by channel noise before the signal points are quantized by a PCM vocoder. Similarly, echoes in a full-duplex system distort transmitted signal points before those points are quantized by the PCM vocoder. In light of such a situation, eliminating quantization noise is not possible.

The various embodiments reduce occurrences of dangerous quantization noise with values that are too large to be corrected by error-correcting coding techniques. The reduction in such large quantization noise can thus, improve the receiver's capability to recover transmitted data.

Figure 1:
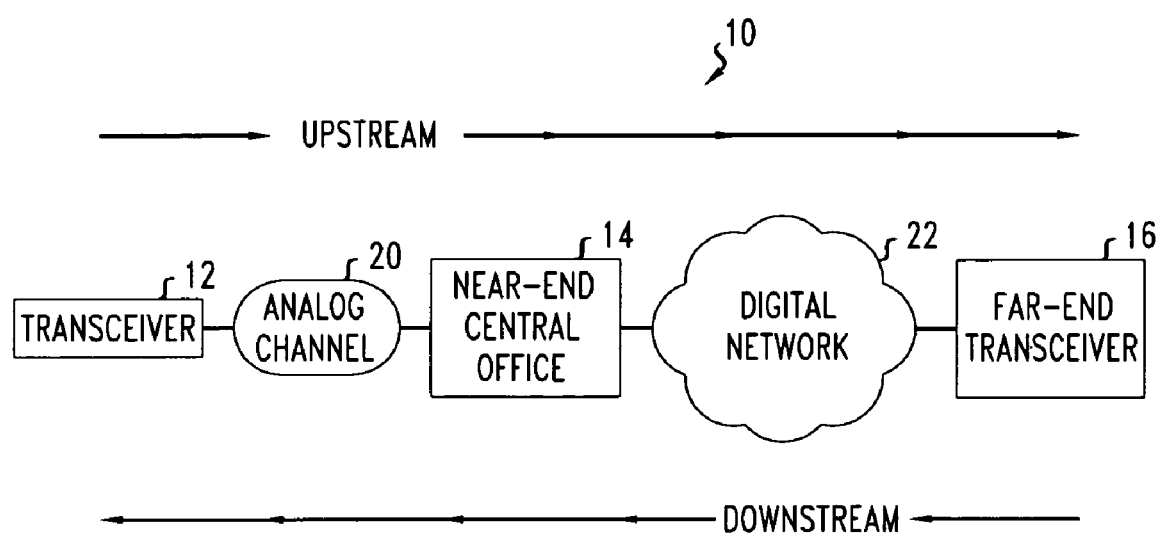
FIG. 1 shows a communication system for transmitting digital data.

FIG. 1 shows a full-duplex communication system 10 for digital data. The system 10 includes a user transceiver 12, a near-end central office 14, and a far-end transceiver 16. The user transceiver 12 couples to the near-end central office 14 via an analog channel 20, e.g., a telephone local loop. An exemplary user transceiver 12 includes a modem. The far-end transceiver 16 couples to the near-end central office 14 via a digital network 22. Exemplary far-end transceivers 16 include servers for Internet service providers.

Herein, upstream and downstream refer to data flows from user transceiver 12 to far-end transceiver 16 and from the far-end transceiver 16 to the user transceiver 12, respectively. The two data flows differ in whether central office 14 and PCM vocoder therein process the data after or before transmission of the data over analog channel 20.

Figure 2:
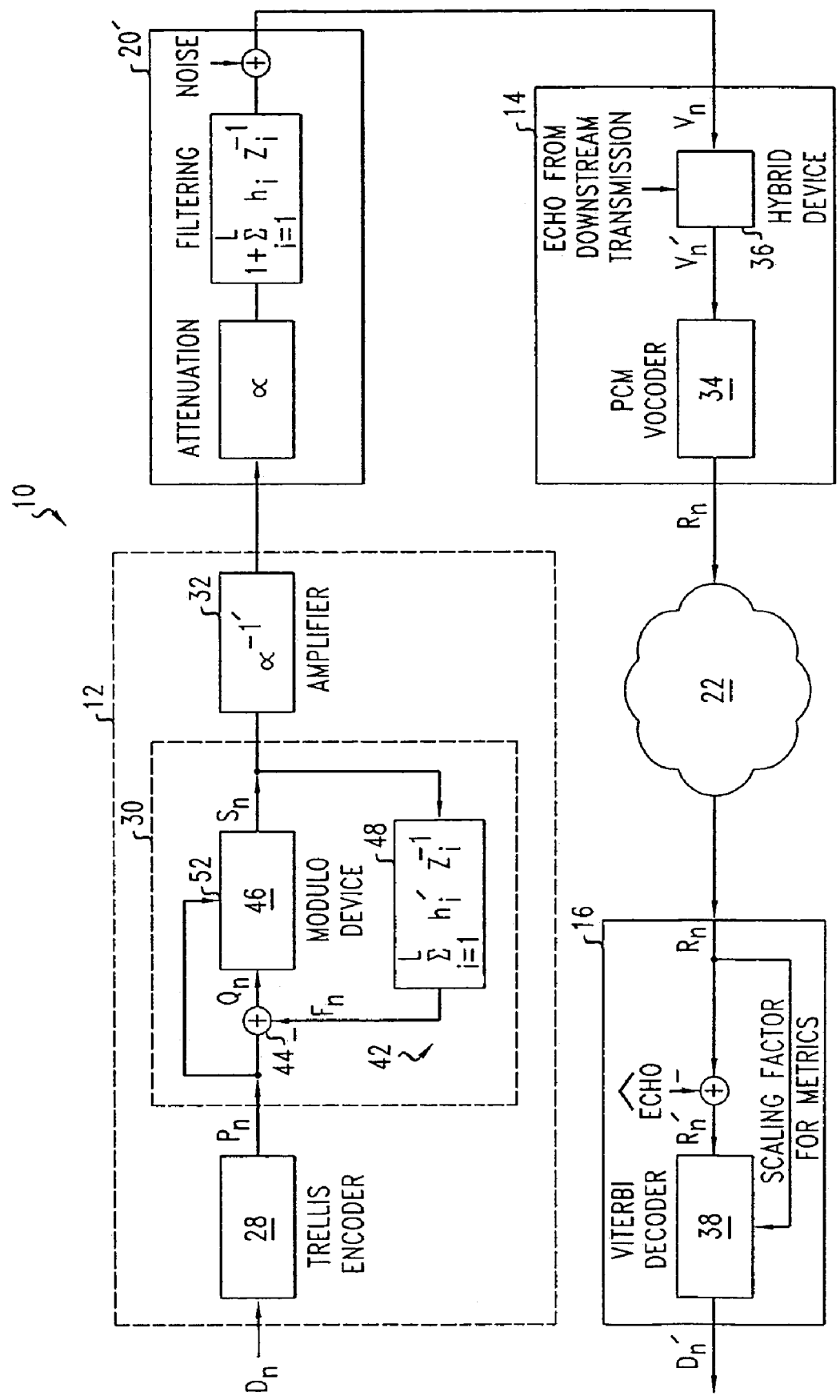
FIG. 2 is a block diagram that shows how data flows upstream in the communication system of FIG. 1.

FIG. 2 illustrates how system 10 of FIG. 1 processes upstream flowing digital data. A transmitter located in near-end transceiver 12 receives a sequence of digital data, $D_n$. The transmitter sends the received $D_n$s to trellis encoder 28 where the $D_n$s are sequentially encoded to produce an output stream of encoded digital signal points, $P_n$. The encoding allows subsequent reduction of transmission errors in far-end transceiver 16. Exemplary encoders 28 are the 4D 16-, 32- or 64-state trellis encoders used in V.34 and V.90 modems. The details for such encoders are described in U.S. Pat. Nos. 5,418,798 and 4,713,817, which are incorporated by reference herein in their entirety.

Trellis encoder 28 sends the $P_n$s to precoder 30 which generates a sequence of signal points, $S_n$ that are precompensated for inter-symbol interference (ISI) in analog channel 20'. From the precoder 30, continuous time signals representative of signal points, $S_n$, go to amplifier 32. The amplifier 32 amplifies the signals by a factor "$\alpha^{-1}$" that is selected to precompensate for attenuation in the analog channel 20' and transmits the amplified signals to analog channel 20'.

For analog channel 20', input and output continuous time signals represent respective digital signals $\alpha^{-1}S_n$ and $V_n$, which are sent during signal transmission intervals. Below, we will primarily refer to these equivalent digital signals.

Analog channel 20' includes analog elements between precoder 30 in the user transceiver 12 and PCM vocoder 34 in near-end central office 14. Thus, the channel 20' includes analog channel 20, output portions of user transceiver 12, and input portions of near-end central office 14, as shown in FIG. 1. The analog channel 20' attenuates transmitted signal points by a factor $\alpha$ and filters the signal points with equivalent digital filter responses $h_i$s. The "$h_i$" describes the amount of ISI that a signal point of the "i"-th earlier transmission interval produces in a signal point of the present transmission interval. The analog channel 20' also adds channel noise to an input signal, e.g., Gaussian noise, to produce an output signal that is representative of a signal point, $V_n$.

Prior to and/or during data communications, user transceiver 12 and far-end central office 16 perform channel testing to estimate the parameters $h_i$ and $\alpha$, which characterize analog channel 20'. The channel testing enables the user transceiver 12 to set parameters $h_i'$, $\alpha^{-1'}$ of the precoder 30 and amplifier 32, respectively, to precompensate for filtering, $h_i$, and attenuation, $\alpha$, generated by the channel 20'.

From analog channel 20', the output signal points, $V_n$, undergo further corruption by echoes in near-end central office 14. The echoes result from impedance mismatches in a hybrid device 36 located in the near-end central office 14. The hybrid device 36 causes downstream flowing signal points to be partially reflected upstream. The echo corrupted signal points, $V_n'$ ($V_n' = V_n$+echo), are received by PCM vocoder 34, which quantizes the signal points, $V_n'$, to produce output digital words, $R_n$. Since the signal points, $V_n'$, include channel noise and echo, the PCM vocoder 34 introduces quantization noise into the digital words, $R_n$.

PCM vocoder 34 quantizes the corrupted signal points, $V_n'$, into 8 bit words according to the known µ-law or the known A-law. Below, the µ-law is used as an exemplary quantization law for the PCM vocoder 34. The near-end central office 14 transmits the sequence of $R_n$s upstream to far-end transceiver 16 via digital network 22.

In far-end transceiver 16, a receiver receives the "echo" corrupting digital words, $R_n$, from digital network 22. In parallel, each $R_n$s is sent to a monitoring device and processed to produce a signal point $R_n'$ from which an estimated value of echo has been subtracted. The monitoring device derives reliability information from each $R_n$. The Viterbi decoder 38 decodes the sequence of echo subtracted $R_n'$s to produce a sequence of output data values, $D_n'$s. The $D_n'$s are estimations of the input data values, $D_n$, originally transmitted by user transceiver 12. The encoding previously performed by trellis encoder 28 enables the far-end transceiver 16 to use Viterbi decoder 38 to recover the transmitted data from the noise-corrupted digital words, $R_n'$.

The Viterbi decoder 38 takes account of the reliability information derived from the received digital words, $R_n$, prior to the removal of echo. Digital words, $R_n$, that correspond to large quantization levels of PCM vocoder 34 are less reliable, because these $R_n$s may contain large quantization noise. The reliability information is also a function of the minimum distance, d, of the constellation.

The reliability information is used to scale the one-dimensional (1D) branch metrics that are calculated at the front end of the Viterbi decoder 38. The value of scaling factor $\beta(R_n)$ depends on the relationship between the maximum possible quantization noise, q, for a value of $R_n$, and the minimum distance, d, in the 1D constellation of signal points, $P_n$. An exemplary $\beta(R_n)$ has the following form:

$$\beta(R_n)=1 \text{ for } q<d/2; \beta(R_n)=(0.75)^2 \text{ for } q=d/2;$$

$$\beta(R_n)=(0.375)^2 \text{ for } q=d; \beta(R_n)=(0.1875)^2 \text{ for } q>d.$$

The value of $\beta(R_n)$ is roughly inversely related to the magnitude of the signal point represented by $R_n$, because quantization noise grows with the magnitude of the signal point.

The Viterbi decoder 38 calculates a path metric for each encoder state (or each surviving path). For 4-dimensional (4D) trellis codes, each path metric is an accumulation of 4D branch metrics. Each 4D branch metric is associated with a 4D subset of signal points of a 4D constellation. Since the 4D subsets are constructed from concatenations of four 1D subsets of a 1D extended constellation, each 4D branch metric is the sum of four 1D branch metrics.

For the 4D trellis codes, scaled 1D branch metrics are then calculated as follows. Depending on the number of states of the trellis code, the 1D extended constellation, e.g., a constellation of FIG. 5, 6, 8, or 9, is partitioned into two or four 1D subsets. In FIGS. 5, 6, 8, and 9, each 1D subset consists of signal points that correspond to bit patterns with the same value for the last bit (for two 1D subsets) or the last two bits (for four 1D subsets). For a received signal point $R_n'$, a 1D metric is calculated for each 1D subset. The 1D metric is the squared Euclidean distance between $R_n'$ and the closest signal point in the 1D subset. Then, the 1D branch metric is scaled before being used to calculate 4D branch metrics and path metrics.

Referring again to user transceiver 12, precoder 30 is a Tomlinson type device that precompensates the sequence of signal points, $P_n$, for ISI in analog channel 20'. The precompensation involves replacing input signal points, $P_n$, of an original constellation, which is derived from the quantization levels of the PCM vocoder 34, by output signal points, $S_n$. Provided that the precoding is matched to the channel ISI, subsequent filtering by analog channel 20' converts the output signal points, $S_n$, into signal points, $V_n$, which, in the absence of channel noise, belong to an extended constellation over the original constellation. The original and extended constellations define the precoder 30.

The precoder 30 includes a feedback loop 42, an adder 44, and a modulo device 46.

The feedback loop 42 includes a finite impulse response (FIR) filter 48, which filters signal points, $S_n$, output during earlier signaling intervals. The FIR filter 48 has a digital response matched to that of channel 20'. In an exemplary precoder 30, the response of filter 48 is matched to that of the channel 20' during an initialization process. The filter's response is:

$$\sum_{i=1}^{L} h'_i Z^{-i}$$

where $Z^{-i}$ is a delay of "i" signaling intervals. During each signaling interval, FIR filter 48 produces a feed back signal point, $F_n$.

The amount of feedback by filter 48 is described by a parameter $\gamma$, defined as:

$$\gamma = \sum_{i=1}^{L} |h'_i|.$$

Larger feedback, i.e., $\gamma$, leads to larger average magnitudes for output signal points, $V_n$ at the near-end central office 14. Since larger $V_n$s lead to larger quantization noise, smaller values of $\gamma$ are generally desirable to keep quantization noise small. In part, the value of $\gamma$ is set by properties of output portions of user transceiver 12. The value of $\gamma$ also determines the size of extended constellations.

During each signaling interval, the adder 44 subtracts the feedback signal $F_n$ from the input signal point $P_n$ to produce a signal, $Q_n$, that is precompensated for ISI in analog channel 20'. The signal, $Q_n$, is given by:

$$Q_n = P_n - F_n = P_n - \sum_{i=1}^{L} h'_i S_{n-i}.$$

The modulo device 46 adds a positive or negative modulo amount, $M(P_n)$, to the $Q_n$ to produce an output signal, $S_n$, that lies in a preselected range, i.e., $S_n = Q_n + M(P_n)$. In the absence of channel noise, transmission of $S_n$ through the analog channel 20' produces:

$$V_n = P_n + M(P_n).$$

Thus, the $V_n$s belong to an extended constellation constructed over the original constellation of the $P_n$s by adding modulo amounts $M(P_n)$. The extended constellation includes the original constellation of the signal points, $P_n$, and signal points offset from points of the original constellation by the modulo amounts $M(P_n)$. The signal points related by modulo amounts $M(P_n)$ are recognized by the far-end transceiver 16 as corresponding to the same original signal point, $P_n$.

Since the signal points of the extended constellation are non-uniformly spaced, the modulo amounts, $M(P_n)$, depend on the value of $P_n$. Modulo device 46 includes an input terminal 52 for the value of $P_n$.

Modulo device 46 adds a positive or negative modulo amount, $M(P_n)$, to a signal point, $Q_n$, in response to the value of $Q_n$ being, respectively, less than a preselected negative threshold or greater than a preselected positive threshold. Some embodiments of modulo device 46 use variable thresholds whose values depend on $P_n$ and are equal to $-\frac{1}{2}M(P_n)$. Other embodiments of modulo device 46 use fixed thresholds. The negative and positive fixed thresholds are, e.g., $T_- = -\frac{1}{2}$ times the maximum value of all positive modulo amounts $M(P_n)$, and $T_+ = -\frac{1}{2}$ times the minimum value of all negative modulo amounts, $M(P_n)$ respectively. Here, the maximum or minimum refers to maximum or minimum values of $M(P_n)$ for signal points in the original constellation.

The magnitude of quantization noise increases as magnitudes of signal points, $V_n$, increase. For signal points with large magnitudes, echo and channel noise can induce quantization noise that cannot be corrected by far-end transceiver 16. Thus, a precoder 30 that sends, on the average, smaller signal points, $V_n$, to PCM vocoder 34 will ordinarily produce lower amounts of this dangerous type of quantization noise. Since the magnitudes of fixed thresholds are larger than the variable thresholds, embodiments of modulo device 46 with fixed thresholds will less often add modulo amounts to signal points $Q_n$ and thus, will less often generate large magnitude signal points, $V_n$, at the PCM vocoder 34. Thus, a precoder 30 with a fixed threshold often produces lower quantization noise than a precoder 30 with variable thresholds. On the other hand, a precoder 30 with variable thresholds should produce lower average output powers. Thus, a transceiver 12 with a variable threshold precoder 30 could compensate higher attenuation in analog channel 20'.

Conventional precoders tried to precompensate for ISI in analog channel 20' so that in the absence of channel noise and echo, signal points would have exactly the values of the quantization levels upon arrival at a receiver's PCM vocoder, e.g., PCM vocoder 34 of FIG. 2. Unfortunately, channel noise and echo cannot be predicted, and thus, cannot be precompensated before transmission. In the presence of substantial channel noise and echo, conventional precoding cannot match signal points to quantization levels at a receiver's PCM vocoder and thus, conventional precoding may produce large quantization noise.

Precoder 30 has an extended constellation that is, on the average, less likely to produce large quantization noise in the presence of echo and channel noise. The smaller quantization noise results, because the signal points of the extended constellation of precoder 30 have a smaller average magnitude than in a conventional extended constellation with the same number of signal points and minimum distance. The smaller quantization noise is more easily corrected by subsequent decoding in far-end transceiver 16.

FIG. 3 shows the quantization levels of a PCM vocoder, which implements μ-law quantization. The μ-law includes a zero quantization level, 127 positive, levels, and 127 negative levels. The positive and negative quantization levels are symmetrically positioned about the zero quantization level and lie in segments $\pm A_1$-$\pm A_8$. Within a segment $\pm A_1$-$\pm A_8$, the quantization levels are approximately uniformly spaced. Between segments, distances between the levels increase with segment index from 1 for segments $\pm A_1$ to 128 for segments $\pm A_8$.

The distance between adjacent quantization levels determines the quantization noise associated with a signal point located near the levels. Thus, quantization errors are higher for signal points located in segments $\pm A_8$ than for signal points located in the other segments $\pm A_1$-$\pm A_7$. The magnitude of quantization noise will, on the average, be smaller if the precoder's extended constellation has signal points of a smaller average magnitude.

Referring again to FIG. 2, trellis encoder 28 produces signal points, $P_n$, that correspond to quantization levels of PCM vocoder 34. When precoder 30 and amplifier 32 are set up to exactly precompensate channel ISI and attenuation, which is referred to as matched to the channel ISI, the precoder 30 transforms signal points, $P_n$, into output signal points, $S_n$. For such a set up, the channel ISI would convert output signals representative of the $S_n$s to signals representing points of an extended constellation in the absence of channel noise and echo. Some of the signal points of the extended constellation associated with the precoder 30 are not quantization levels of the PCM vocoder 34. Using signal points that do not correspond to valid quantization levels enables the precoder 30 to reduce the average magnitude of the signal points of the extended constellation. Reducing the average magnitude of such signal points lowers the average magnitude of quantization noise from PCM vocoder 34 in the presence of channel noise and echo so that quantization noise can be more easily corrected during decoding in far-end transceiver 16.

Since the new extended constellations have signal points that are not quantization levels, these constellations produce some quantization noise even in the absence of channel noise and echo. The system 10 trades off this new production of quantization noise against a reduction in large quantization noise, e.g., noise associated with segments $\pm A_8$ and in some embodiments segments $\pm A_7$ of PCM vocoder 34, in the presence of channel noise and echo. Exemplary large quantization noise has a magnitude that is two or more times the minimum distance, d, of the associated constellation.

The new extended constellations of precoder 30 are constructed from underlying spaces of signal points. The underlying spaces take account of the non-uniformity of the quantization levels of the μ-law.

FIG. 4 shows an underlying space 54 for constructing new extended constellations with a minimum distance of 32 between signal points therein. The constellations are designed for transmitting signal points to PCM vocoder 34, which uses μ-law quantization. The space 54 includes low, medium, and high magnitude signal points 55-57. The low magnitude points 55 are quantization levels of the PCM vocoder 34 and have the lowest magnitudes, i.e., up to 991.5. The low magnitude points 55 are uniformly spaced at the minimum distance of 32. The medium magnitude points 56 have larger magnitudes, i.e., between 1,039.5 and 1,999.5, and are also quantization levels of the PCM vocoder 34. The medium magnitude points 56 are uniformly spaced at distances of 64. The high magnitude points 57 have the largest magnitudes, i.e., greater than 2,063.5, and include signal points that are quantization levels of the PCM vocoder 34 and signal points that are not quantization levels of the PCM vocoder 34. The signal points 57 that are not quantization levels of the μ-law are indicated by "*s".

The inclusion of signal points that are not quantization levels of the μ-law enables reducing distances between high magnitude points 57 from about 128 for segments $\pm A_8$ of PCM vocoder 34, as shown in FIG. 3, to 32 in the underlying space 54. The smaller distances between signal points enables a higher density packing of signal points in an extended constellation derived from the underlying space 54 than in an extended constellation derived solely from the quantization levels of the μ-law, as shown in FIG. 3. The higher density packing implies that echo and channel noise are more likely to shift signal points, $V_n'$, towards smaller magnitude regions of the μ-law where subsequent quantization noise will be smaller. The smaller quantization noise can be more easily corrected by decoding in Viterbi decoder 38 of the far-end transceiver 16. Thus, a precoder 30 based on an extended constellation derived from the underlying space 54 should generate smaller magnitude quantization noise than a conventional precoder that uses an extended constellation derived solely from the quantization levels shown in FIG. 3.

FIGS. 5A-6B and 6A-6B show extended constellations derived from underlying space 54 of FIG. 4. The extended constellations provide minimum distances of 32 between signal points of 40-point and 48-point original constellations 62, 72, respectively. The signal points 62, 72 are representative of bit patterns 63, 73. The extended constellations also have upper portions 64, 74 and lower portions 65, 75 in which signal points are related to signal points of the original constellations 62, 72 by addition of positive modular amounts 67, 77 and negative modular amounts 68, 78, respectively. The signal points that are related by additions of modulo amounts are representative of the same bit patterns 63, 73.

Exemplary fixed thresholds for adding positive/negative modular amounts to signal point, $Q_n$, in precoder 30 can be set at, for example, −908/+908 and −1,040/+1,040 in the extended constellations of FIGS. 5A-5B and 6A-6B, respectively. The variable thresholds for adding modulo amounts are minus one half times the values of the modulo amounts themselves.

To derive extended constellations of FIGS. 5A-5B or 6A-6B from underlying space 54 of FIG. 4, one counts the needed number of signal points in the desired extended constellation. The needed number of signal points is determined by the number of upper portions 64, 74 and lower portions 65, 75 desired. Then, one identifies the needed number of signal points of lowest magnitude from the underlying space 54 as the signal points of the extended constellation.

FIG. 7 shows an underlying space 80 useful for constructing extended constellations with minimum distance of 16 between signal points therein. The constellations are designed for a precoder 30 that transmits to a PCM vocoder 34, as shown in FIG. 2. The underlying space 80 includes low, medium, and high magnitude signal points 82, 84, 86. The low and medium magnitude points 82, 84 are μ-law quantization levels of the PCM vocoder 34 and have magnitudes up to 991.5. The low and medium magnitude points 82, 84 are spaced at distances of up to 32. The high magnitude points 86 have larger magnitudes, i.e., between 1,023.5 and 1,807.5, and include signal points that are quantization levels of the PCM vocoder 34 and signal points that are not quantization levels of the PCM vocoder 34. The signal points that are not quantization levels of the PCM vocoder 34 are indicated by "*s".

The inclusion of signal points in space 80 that are not quantization levels of the μ-law again reduces distances between high magnitude points 86. The magnitude of the quantization noise that can be handled by decoder 38 of FIG. 2 is a function of the minimum distance, d, of the constellation and a function of the coding performed by trellis encoder 28. Where the magnitude of the quantization noise is smaller, the noise can be more easily corrected during decoding. For the 4D 64-state trellis code, the Viterbi decoder 38 can handle quantization noise of magnitude d, but not quantization noise of magnitude 2d. If signal points with potential quantization noise of magnitude 2d have to be used in the extended constellation, it is not very relevant whether the points correspond to valid quantization levels. In fact, a higher density packing of signal points, which is achieved by assigning some of the points to invalid quantization levels, increases the probability that echo or channel noise will lower the magnitudes of signal points $V_n'$ to values for which the associated quantization noise can be corrected by the decoder 38.

FIGS. 8A-8B and 9A-9B show extended constellations derived from underlying space 80 of FIG. 7. The extended constellations provide 40-point and 48-point original constellations 92, 102, respectively. In the extended constellations, minimum distances between signal points are 16. The signal points 92, 102 are representative of bit patterns 93, 103. The extended constellations have upper portions 94, 104 and lower portions 95, 105 with signal points related to those of the original constellations 92, 102 by addition of positive modular amounts 97, 107 and negative modular amounts 98, 108, respectively. The related signal points correspond to the same bit patterns 93, 103.

Exemplary fixed thresholds for adding positive/negative modular amounts to signal point, $Q_n$, in precoder 30 can be set at, for example, −459/+459 and −524/+524 in the extended constellations of FIGS. 8A-8B and 9A-9B, respectively.

To derive the extended constellations of FIGS. 8A-8B or 9A-9B, one counts the number of signal points in the extended constellation and uses the signal points of lowest magnitude from the underlying space 80 of FIG. 7 as the signal points of the extended constellation. This construction enables noise and echo to shift the signal points, $V_n'$, to smaller values where quantization noise is smaller and easier to correct during subsequent decoding.

Referring to FIGS. 1 and 2, an embodiment of communication system 10 in which near-end central office 14 has an A/D converter that operates according to another quantization law also has an underlying space that is useful in designing the extended constellation of precoder 30. To construct the underlying space with a preselected minimum distance between its signal points, the quantization levels of the quantization law are labeled as high or low magnitude levels. At high magnitude levels, quantization noise is too large to be corrected by a preselected channel-coding scheme with the constellation derived from the underlying space. For high magnitude levels, a signal point corresponding to each quantization level is added to the underlying space. Between the high magnitude levels, additional signal points are added to the underlying space to ensure that distances between adjacent signal points are equal to the preselected minimum distance. Finally, the underlying space is completed by adding signal points corresponding to the low magnitude quantization levels' so that the minimum distance between these points is the same as the preselected minimum distance.

An extended constellation is formed by selecting from the underlying space the needed number of signal points of lowest magnitude.

Figure 10:
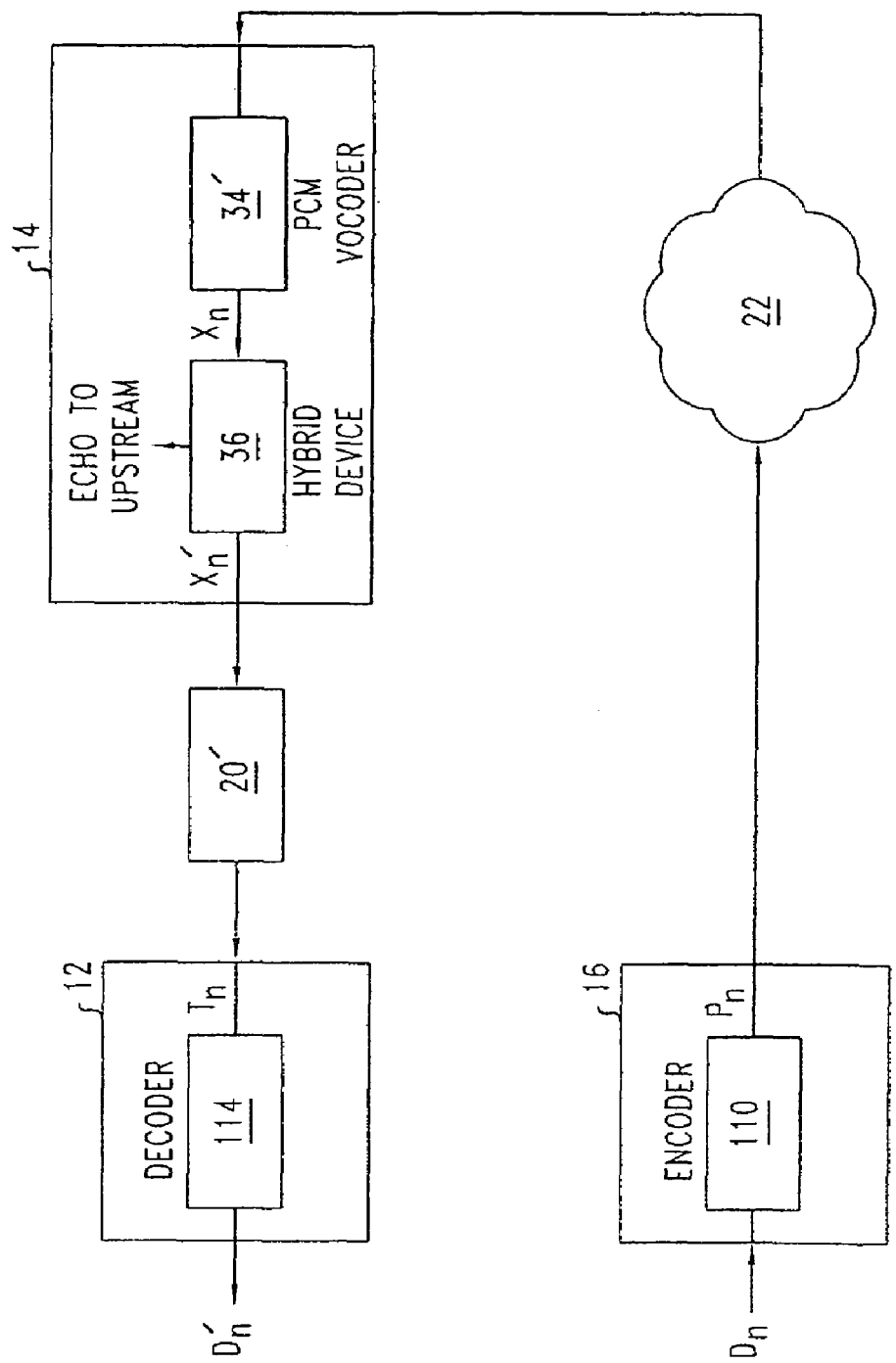
FIG. 10 is a block diagram that shows how data flows downstream in one embodiment of the communication system of FIG. 1.

Since echoes from downstream transmission increase quantization noise associated with upstream transmission. Some embodiments of communication system 10, as shown in FIG. 1, reduce echo levels from downstream transmission in order to lower quantization noise associated with upstream transmission. FIG. 10 illustrates one such embodiment of the communication system 10.

FIG. 10 is a block diagram showing downstream transmission in one embodiment of communication system 10 of FIG. 1. In a downstream transmission, far-end transceiver 16 sends input digital data, $D_n$, to a channel encoder 110. The encoder 110 produces encoded signal points, $P_n$, by a coding scheme that can reduce the signal power transmitted to analog channel 20' without sacrificing the data rate or degrading the error rate performance in the downstream transmission. Exemplary encoders 110 include trellis encoders compatible with the V.34 and V.90 standards and probabilistic trellis encoders as described in U.S. Pat. No. 6,157,678, which is incorporated herein by reference in its entirety. The encoder 110 transmits a sequence of the signal points $P_n$ to near-end central office 14 via digital network 22.

The lowered downstream power reduces echo to upstream transmissions in near-end central office 14. The lowered echo reduces quantization noise in the upstream transmissions. In some embodiments, downstream average power levels are reduced by about 3-6 decibels with respect to optimal power or regulatory allowed power levels for such transmissions in order to increase the data rate for upstream transmissions. In exemplary embodiments, the downstream power is reduced by using a constellation with a reduced minimum distance.

In the near-end central office 14, PCM vocoder 34' converts the digital signal points, $P_n$, from far-end transceiver 16 into analog signals. The output analog signals are continuous in time, but represent digital signal points, $X_n$. The conversion does not produce quantization noise, because the constellation of the $P_n$s only includes quantization levels of the PCM vocoder 34'. Furthermore, unlike an analog channel, a digital network 22 does not distort the signal points, $P_n$, transmitted therethrough. After conversion, the signals representing the $X_n$s are sent to hybrid device 36. From the signal representing $X_n$, the hybrid device 36 produces an output signal representing signal point $X_n'$ in the downstream and an echo in the upstream.

The analog channel 20' distorts the signals representing signal points, $X_n'$, which were received from hybrid device 36, with channel noise, ISI, and attenuation prior to delivering distorted signals representing signal points, $T_n$, to user transceiver 12.

The user transceiver 12 includes a decoder 114 that corrects transmission noise and recovers a sequence of estimated data values, $D_n'$. The decoder 114 uses a decoding algorithm adapted to the type of encoding performed in far-end transceiver 16. For example, if the far-end transceiver 16 performed trellis encoding, the decoder 114 performs a Viterbi decoding algorithm.

Figure 11:
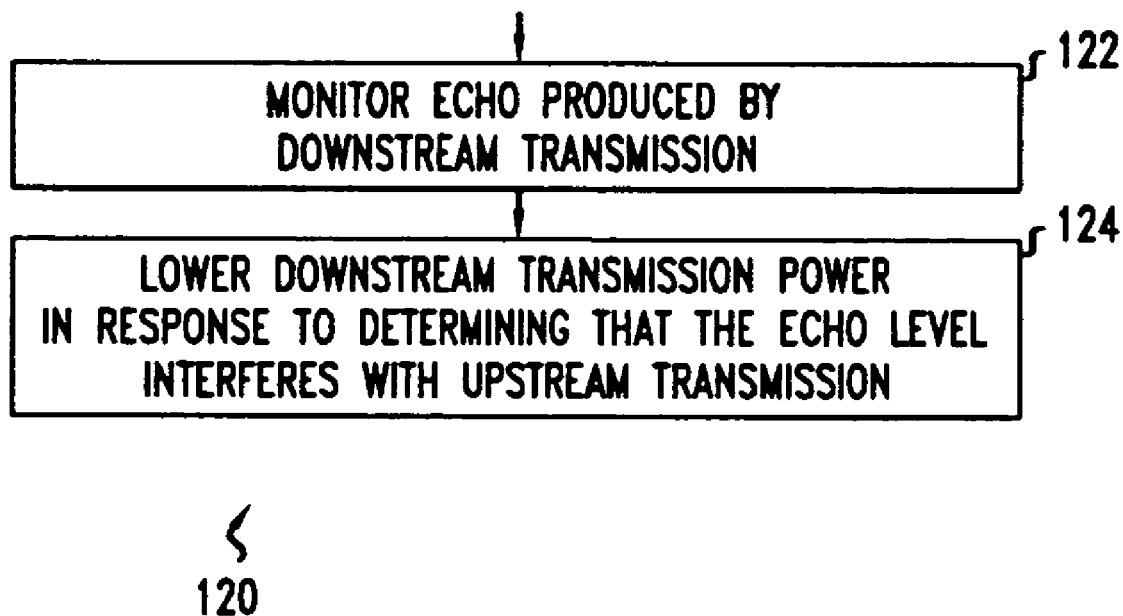
FIG. 11 is a flow chart for a process that sets downstream power levels in the communication system of FIGS. 1, 2, and 10.

FIG. 11 shows a process 120 used by far-end transceiver 16 of FIGS. 1, 2, and 10 to set transmission powers. The far-end transceiver 16 monitors echo levels produced by downstream transmission (step 122). The echo is produced by hybrid device 36 in near-end central office 14. If the echo level is large enough to interfere with upstream data transmission, e.g., by generation of quantization noise, the far-end transceiver 16 reduces the average downstream power to lower the echo level (124). Reducing the downstream power my include using a constellation that has a smaller size or a smaller minimum distance for downstream transmissions. The far-end transceiver 16 may also apply a coding scheme to data prior to downstream transmission so that the downstream power can be reduced without lowering the downstream data rate or degrading the downstream error performance.

Referring again to FIG. 2, other embodiments of precoder 30 use an extended constellation with a size that is more than 3 times that of the original constellation. For example, the extended constellation may have more than one upper portion and/or more than one lower portion. Such larger constellations may be desirable for larger values of feedback parameter γ. For such values, the feedback loop 42 generates signals $F_n$ of larger magnitude and adder 44 is more likely to produce signals $Q_n$ of larger magnitude.

In some embodiments, the extended constellation is a non-integral number of times as large as the original constellation.

In other embodiments, PCM vocoder 34 of near-end central office 14 is replaced by a new analog-to-digital (A/D) converter. The new A/D converter quantizes received signal points according to a new quantization law and not the μ-law. For such embodiments, precoder 30 has an original constellation that includes signal points that correspond to the quantization levels of the new law and an extended constellation that includes some signal points that are quantization levels and other signal points that are not quantization levels of the new law.

In some embodiments, trellis encoder 28 and precoder 30 are combined into a single encoder/precoder. The combined encoder/precoder is still characterized by original and extended constellations. The combined encoder/precoder produces signal points, $S_n$, of the original constellation when configured to precompensate for an analog channel 20' with no ISI, i.e., when the feedback coefficients "$h_i$'" are set to zero. The constellations have signal points whose values are related to the quantization levels of the near-end central office 14 as previously described.

In some embodiments a portion of the signal points of the original constellation do not correspond to quantization levels of the PCM vocoder 34. The majority of the points in the original constellation correspond, however to quantization levels.

Other embodiments will be apparent to those of skill in the art in light of the above description, figures, and claims.

What I claim is:

1. A process for communicating data over an analog channel in both downstream and upstream directions, comprising:
   in a far-end transceiver, monitoring a quantity representative of an echo level caused by downstream digital data transmission from the transceiver via a digital network to the analog channel; and
   lowering a power level for downstream digital data transmissions over the analog channel in response to determining that the echo level interferes with upstream digital data transmissions over the analog channel to the transceiver via the digital network.

2. The process of claim 1, wherein the lowering a power level includes using a constellation with a smaller size for the downstream data transmission.

3. The process of claim 1, wherein the lowering a power level includes using a constellation with a reduced minimum distance for the downstream data transmission.

4. A transceiver for transmitting and receiving digital data via a mixed channel that includes a digital network and an analog channel serially connected to the digital network, comprising:
   a transmitter capable of error-encoding digital data and of transmitting encoded data downstream to a target transceiver via the mixed channel; and
   a receiver capable of error-decoding received digital data transmitted upstream from the target transceiver via the mixed channel, the transmitter being configured to reduce downstream transmission power in response to the receiver determining that echo from the downstream data transmission to the target transceiver interferes with the upstream data transmission from the target transceiver to the analog channel and then, to the digital network that connects to the receiver.

5. The transceiver of claim 4, wherein the transmitter is configured to lower the downstream transmission power in response to determining that the level of the downstream transmission power causes an above-threshold noise level in upstream transmissions from the target receiver to the digital network.

6. The transceiver of claim 4, wherein the transmitter includes a probabilistic trellis encoder to perform the encoding.

7. The transceiver of claim 4, wherein the receiver includes a Viterbi decoder and is configured to scale 1D branch metrics used in the decoder in a manner responsive to reliability information derived from the received digital data.

8. The transceiver of claim 4, wherein the transmitter is configured to use a constellation with a smaller size to reduce the downstream transmission power.

9. The transceiver of claim 4, wherein the transmitter is configured to use a constellation with a reduced minimum distance to reduce the downstream transmission power.

* * * * *